United States Patent [19]

Miyazaki et al.

[11] Patent Number: 5,212,438
[45] Date of Patent: May 18, 1993

[54] INDUCTION MOTOR CONTROL SYSTEM

[75] Inventors: Masanori Miyazaki, Tokorozawa; Yasuhiro Suzuki, Kunitachi; Tadashi Saito, Fuchu, all of Japan;

[73] Assignee: Kabushiki Kaisha Toshiba, Kawasaki, Japan

[21] Appl. No.: 873,711

[22] Filed: Apr. 22, 1992

Related U.S. Application Data

[63] Continuation of Ser. No. 248,384, Sep. 23, 1988, abandoned.

[30] Foreign Application Priority Data

Sep. 24, 1987 [JP] Japan ................... 62-237302
Jan. 4, 1988 [JP] Japan ...................... 63-209

[51] Int. Cl.$^5$ .............................................. H02D 5/40
[52] U.S. Cl. ...................................... 318/805; 318/807
[58] Field of Search ............... 318/800, 803, 805, 807, 318/809, 811, 778

[56] References Cited

U.S. PATENT DOCUMENTS

| | | | |
|---|---|---|---|
| 4,311,951 | 1/1982 | Walker et al. | 318/778 |
| 4,409,533 | 10/1983 | Kawabata | 318/807 |
| 4,456,868 | 6/1984 | Yamamura et al. | 318/800 |
| 4,566,289 | 1/1986 | Iizuka et al. | 62/228.4 |
| 4,673,858 | 7/1987 | Saito | 318/805 |
| 4,757,248 | 7/1988 | Fujioka et al. | 318/800 |
| 4,758,771 | 7/1988 | Saito et al. | 318/807 |

FOREIGN PATENT DOCUMENTS 0173216 3/1986 European Pat. Off. .
3441836 5/1985 Fed. Rep. of Germany .

OTHER PUBLICATIONS

Patent Abstracts of Japan, vol. 7, No. 280 (E-216) [1425], Dec. 14, 1983, (JP-58159692).

Primary Examiner—William W. Shoop, Jr.
Assistant Examiner—John W. Cabeca
Attorney, Agent, or Firm—Foley & Lardner

[57] ABSTRACT

In order to carry out commercial synchronous exchange for disconnecting an induction motor from its driving power supply and connecting it to a variable frequency power supply or commercial synchronous switching for disconnecting the induction motor from the variable frequency power supply and connecting it to a commercial power supply without any accompanying adverse shock, an induction-motor vector control technique is utilized and furthermore, a phase-locked loop (PLL) is formed to detect the difference in phase between the phase of the output voltage from the variable frequency power supply or the magnetic flux phase of the induction motor on the one hand, and the phase of the voltage of the power supply on the other, so that the difference in phase thus detected can be maintained at a predetermined value.

3 Claims, 9 Drawing Sheets

INDUCTION MOTOR CONTROL SYSTEM

This application is a continuation of application Ser. No. 07/248,384, filed Sep. 23, 1988, now abandoned.

BACKGROUND OF THE INVENTION

1. Field of the Art

The present invention relates to an induction motor control system and more particularly, to an induction motor control system capable of smoothly switching an induction motor driving power supply between a commerical power supply and a variable frequency power supply.

2. Prior Art

A switching system in which, while an alternating-current motor is driven by the power supplied from a power supply with a predetermined frequency (to be referred to as "a commercial power supply" hereinafter in this specification), the output voltage of a variable frequency power supply (to be referred to as "a frequency changer or converter" hereinafter in this specification) is made to coincide with the voltage, frequency and phase of the commercial power supply and then the frequency converter is connected to the alternating-current motor while the commercial power supply is disconnected therefrom so that the alternating-current motor is driven by only the power supplied from the frequency converter, is called a commercial synchronous exchange (to be referred to as "exchange" hereinafter in this specification). Conversely, the systems for switching an alternating-current motor, which has been driven at various speeds by the power supplied from a frequency converter being disconnected therefrom and then connected to a commercial power supply, may be divided into various asynchronous switching systems; a system in which the power supply for the motor is once cut off and then the motor connected to a commercial power supply; a switching system in which an excess current is suppressed through a reactor in the case of switching, and so on, and a switching system in which the motor is disconnected from the commercial power supply or the frequency converter and connected to the frequency converter or the commercial power supply while the commercial power supply and the frequency converter are maintained in voltage synchronization, is called "the commercial synchronous switching system" and is an excellent switching system because when switching, there are no shock torque and no excess current.

However in the case of the synchronous switching of the induction motor, there still exist some technical problems. One problem is that because the induction motor slips, even when the motor is driven by the commercial power supply, the rotational speed of the motor varies depending upon whether a load is heavy or light. Therefore in the case of the induction motors which accomplish the above-described exchange, the V/F control system for controlling the primary frequency and not the rotational speed, has been widely used.

However, the prior art control systems control the output frequency of the frequency converter; that is, the primary frequency of the motor so that it is impossible to control the rotational speed of the induction motor with a high degree of accuracy. Furthermore, the output frequency of the frequency converter is controlled by an open-loop system so that there arises a problem of control system instability in case of acceleration, deceleration or variations in load.

SUMMARY OF THE INVENTION

In view of the above, the primary object of the present invention is to provide an induction motor control system capable of stable commercial frequency switching and/or commercial synchronous exchange.

Another object of the present invention is to provide an induction motor control system incorporating a detector or sensor with a simple construction so that the stable commercial synchronous exchange can be carried out.

To the above and other ends, in an induction motor control system of the type comprising a variable frequency power supply for driving an induction motor at various speeds, vector control means for carrying out the vector control of the variable frequency power supply in response to a torque current reference and an exciting current reference computed on the basis of a speed reference and a magnetic flux reference, respectively, so that the rotational speed and voltage of the induction motor can be maintained at predetermined values, respectively, and switching means for selectively connecting the induction motor to a commercial power supply or the variable frequency power supply, the present invention is characterized by the provision of phase-difference detection means for detecting a phase difference between the output voltage phase of the variable frequency power supply or the magnetic flux phase of the induction motor on the one hand, and the voltage phase of the commercial power supply and a phase-locked loop for maintaining the phase difference detected by aid of phase-difference detection means in the case of the commercial synchronous switching and/or commercial synchronous exchange.

DESCRIPTION OF THE PREFERRED EMBODIMENT

First Embodiment

Figure 1:
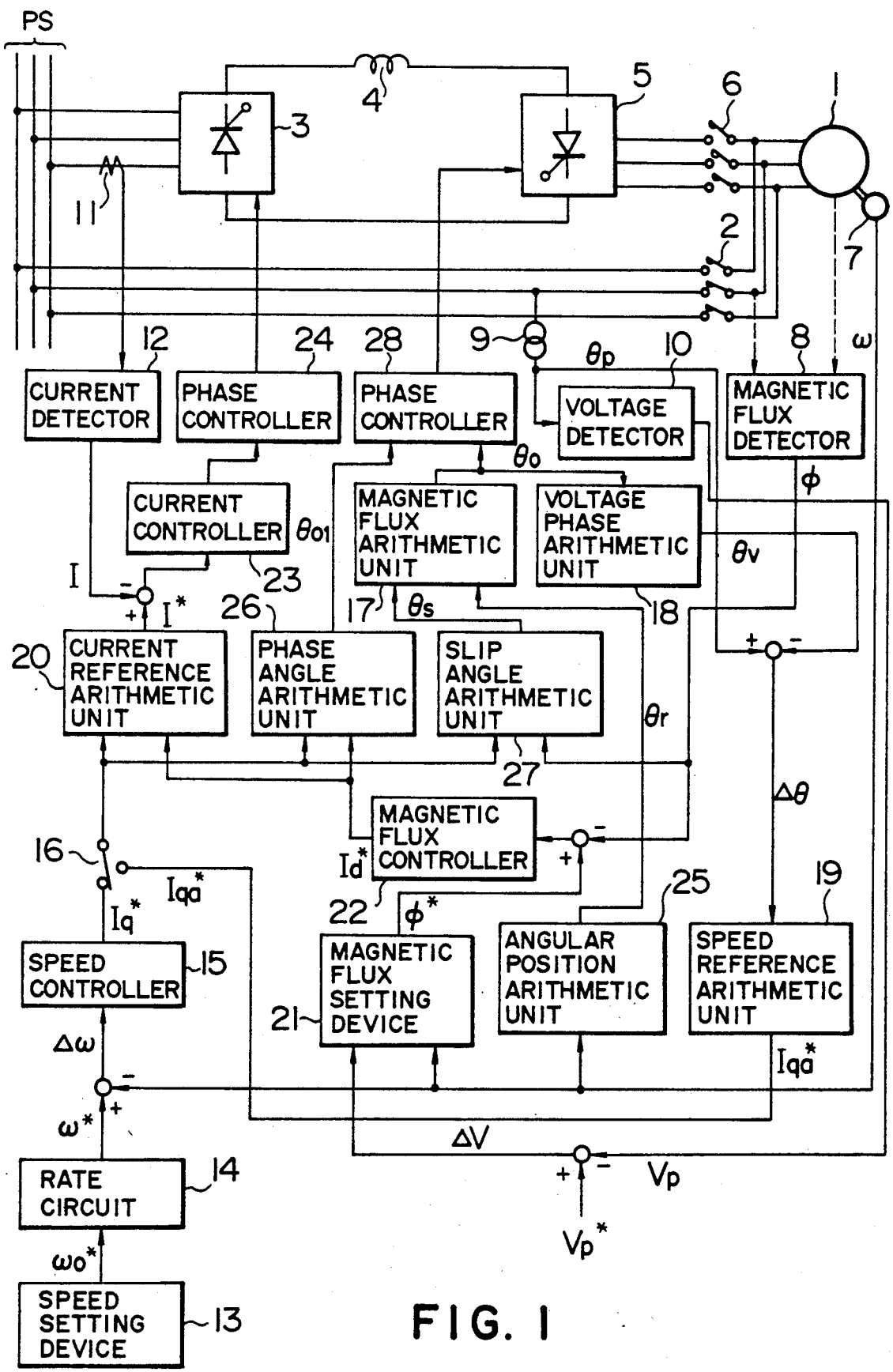
FIG. 1 is a block diagram of a first embodiment of an induction motor control system in accordance with the present invention.

FIG. 1 shows a first embodiment of a system capable of the commercial synchronous exchange in accordance with the present invention. In FIG. 1, an induction motor 1 can be driven not only by a commercial power supply PS through a switch 2 but also by a controllable commutator 3 through a smoothing DC reactor 4, an inverter 5 and a switch 6. The control system includes various detecting elements such as a speed detector 7 for detecting the rotational speed $\omega$ of the induction motor 1; a magnetic flux detector 8 for detecting the magnetic flux $\Phi$ of the induction motor 1 directly therefrom or by the arithmetic operations of the primary current and the primary voltage; a voltage detector 10 for detecting the voltage $V_p$ of the commercial power supply PS through an instrument transformer 9 and a current detector 12 for detecting a load current of the commutator 3 and the inverter 5; that is, the primary current I through a current transformer on the AC side of the commutator 3.

In the control system for the commutator 3, a speed controller 15 computes a torque current $I_q^*$ which makes the speed difference $\Delta\omega$ between the speed refrence $\omega^*$ obtained through a rate circuit 14 from a set speed $\omega_o^*$ set by a speed setting device 13 on the one hand, and the rotational speed $\omega$ of the induction motor 1 detected by the speed detector 7 zero and the output from the speed controller 15 is applied to a first fixed or stationary contact of a switch 16. In response to the magnetic flux phase $\theta_o$ computed by a magnetic-flux arithmetic unit 17 to be described in detail hereinafter, a voltage phase arithmetic unit 18 computes the motor voltage phase $\Phi_v$. In response to the difference in phase $\Delta\theta$ between the motor voltage phase $\theta_v$ thus obtained on the one hand and the voltage phase $\theta_p$ of the commercial power supply PS obtained through the instrument transformer on the other hand, a speed-reference arithmetic unit 19 computes a torque current reference $I_{qa}^*$ which in turn is applied to the second fixed contact of the switch 16. The switch 16 selects the torque current reference $I_q^*$ or $I_{qa}^*$ depending upon a switching position and feed the selected reference to a current reference arithmetic unit 20.

A magnetic-flux setting device 21 obtains a magnetic flux reference $\Phi^*$ which is defined by the correction of the magnetic flux reference depending upon the rotational speed $\omega$ of the induction motor 1 by the difference in voltage $\Delta V$ between the set point $V_p^*$ of the motor terminal voltage on the one hand and the voltage $V_p$ of the commercial power supply PS detected by the voltage detector 10. A magnetic flux controller 22 computes an excitation current reference $I_d^*$ which makes the difference between the magnetic flux reference $\Phi^*$ and the magnetic flux $\Phi$ zero.

The current-reference arithmetic unit 20 computes a primary current reference $I^*$ corresponding to a vector sum of the torque current reference $I_q^*$ fed from the switch 16 and the exciting current reference $I_d^*$ obtained by the magnetic flux controller 22. The phase control of the commutator 3 is carried out by the current controller 23 and the phase controller 24 in such a manner that the difference between the primary current reference $I^*$ and the primary current I derived from the current detector 12 becomes zero.

In the control system of the inverter 5, an angularposition arithmetic unit 25 integrates the speed $\omega$ detected by the speed detector 7 so as to compute an angular position $\theta_r$ of the rotor of the induction motor 1. Furthermore, in response to the torque current reference $I_q^*$ and the excitation current reference $I_d^*$, a phase-angle arithmetic unit 26 computes a phase angle $\theta_{01}$ between the primary current reference $I^*$ and the magnetic flux reference $\Phi^*$ and in response to the torque current reference $I_q^*$ and the magnetic flux $\Phi$, a slip-angle arithmetic unit 27 computes a slip angle $\theta_s$.

In response to the rotor's angular position $\theta_s$ and the slip angle $\theta_s$, the magnetic-flux-phase arithmetic unit 17 computes a magnetic-flux angular position $\theta_0$. In response to the sum of the magnetic flux angular position $\theta_0$ and the phase angle $\theta_{01}$ computed by the phase-angle arithmetic unit 26, a phase controller 28 causes the phase control of the inverter 5 in such a way that the output current phase of the inverter, that is, the primary current phase $\theta_1$ of the induction motor 1, can be attained.

Meanwhile, in the first embodiment shown in FIG. 1, when the switch 16 is switched to the position opposite to that shown in FIG. 1, the speed-reference arithmetic unit 19, the slip-angle arithmetic unit 27, the magnetic-flux arithmetic unit 17 and the voltage-phase arithmetic unit 18 constitute a phase-locked loop (PLL) so that the difference between the motor voltage phase $\theta_r$ and the power supply voltage phase $\theta_p$ becomes zero.

Next, the mode of operation of the first embodiment with the above-described construction will be described.

In the case of commercial synchronous switching, first the switch 2 is kept open while the switch 6 is kept closed and then the switch 16 is actuated to the position shown in FIG. 1 so that the inverter 5 accelerates the induction motor 1 to a speed close to the frequency of the commercial power supply PS. Next the switch 16 is switched to the opposite position. The PLL comprising the speed-reference arithmetic unit 19, the slip-angle arithmetic unit 27, the magnetic-flux arithmetic unit 17 and the voltage-phase arithmetic unit 18 obtains the difference in phase $\Delta\theta$ between the power-supply-voltage phase $\theta_p$ and the inverter-outputvoltage phase $\theta_v$ and controls the in such a way that the phase difference $\Delta\theta$ thus obtained becomes zero. When the phase difference $\Delta\theta$ becomes zero, the switch 6 is opened while the switch 2 is closed, whereby the commercial synchronous switching is accomplished without any shock.

Next the mode of the commercial synchronous exchange for driving the induction motor 1, which has been driven by the commercial power supply, by switching to the inverter 5 will be described. In this case, prior to the switching, the output of the inverter 5 is opened while the switch 16 is switched to the position opposite that shown in FIG. 1. The voltage-phase arithmetic unit 18 computes the motor-voltage phase $\theta_v$ by using the angular position $\theta_0$ of the magnetic flux which is always maintained in a predetermined phase relationship with the output voltage from the inverter 5 instead of the inverter output voltage and the speed-reference arithmetic unit 19 computes a torque current reference $I_{qa}^*$ from the difference in phase $\Delta\theta$ between the motor-voltage phase $\theta_v$ and the power-supply-voltage phase $\theta_p$ and the torque current reference $I_{qa}^*$ is fed into the current-reference arithmetic unit 20. The phase $\theta_i$ of the output current from the inverter 5 leads the magnetic flux angular position $\theta_0$ by $\theta_{01}$ and lags the voltage phase $\theta_v$ by the angle of power factor so that even when the power factor on the commercial power supply PS side is not detected, the power-factor-current-phase of the induction motor 1 can be determined.

In this case, the phase $\theta_v$ of the terminal voltage of the induction motor 1 can be controlled but the amplitude of the terminal voltage cannot be controlled. As a result, when the voltage of the commercial power supply PS varies, there arises a difference between the output voltage of the inverter during its operation and the commercial power-supply voltage so that there is the danger that in the case of switching the power supply in order to accomplish the commercial synchronous switching or synchronous exchange, an excess motor current flows. Therefore, in the first embodiment shown in FIG. 1, the power-supply voltage $V_p$ is detected by the voltage detector 10 to obtain a difference in voltage $\Delta V$ between the power-supply voltage $V_p$ and the set point $V_p^*$ of the motor terminal voltage so that the magnetic flux reference $\Phi^*$ or the exciting current reference $I_d^*$ is corrected. It follows therefore, that when the power-supply voltage $V_p$ is increased (or decreased), the magnetic flux $\Phi$ or the exciting current component $I_d$ is increased (or decreased) and consequently after the terminal voltage of the induction motor 1 is made equal to the power-supply voltage even when the inverter is operating, the switch 2 is opened while the switch 6 is closed and then the switch 16 is reversed to its initial position shown in FIG. 1, whereby the commercial synchronous exchange can be accomplished without any shock.

Second Embodiment

Figure 2:
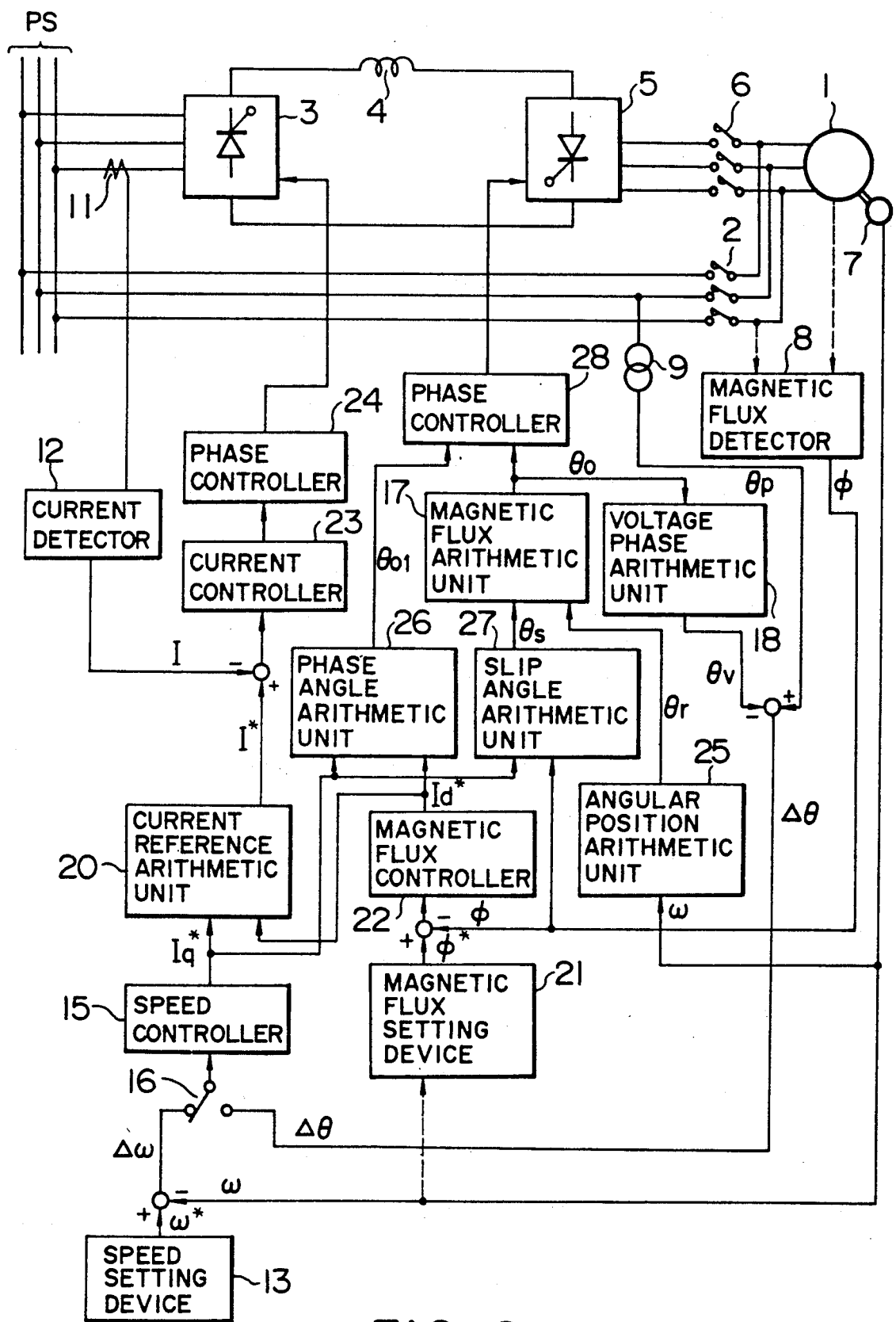
FIG. 2 is a block diagram of a second embodiment of an induction motor control system in accordance with the present invention.

FIG. 2 shows a second preferred embodiment of the present invention best adapted to accomplish the commercial synchronous exchange. In the second embodiment, the switch 16 is not connected to the input of the current-reference arithmetic unit 20, but is connected to the input of the speed regulator or controller 15. Furthermore, the rate circuit and the voltage detector are eliminated. In the second embodiment, therefore, the speed setting device 13 directly determines a speed reference $\omega^*$ and the difference $\Delta\omega$ between the speed reference $\omega^*$ and the speed $\omega$ of the motor is applied to one switching contact of the switch 16. The voltage phase difference $\Delta\theta=\theta_v-\theta_p$ is applied to the other fixed or stationary contact of the switch 16. Therefore, when the switch 16 is switched to the position opposite to that shown in FIG. 2, the speed controller 15, the slip-angle arithmetic unit 27, the magnetic-flux-phase arithmetic unit 17 and the voltage-phase arithmetic unit 18 constitute a phase-locked loop (PLL).

It is now assumed that the commercial-power-supply-side switch 2 is closed so that the induction motor 1 is driven by the power supplied from the commercial power supply PS. In this case, the phase $\theta_p$ of the commercial power supply is detected and compared with the phase $\theta_v$ of the inverter output voltage obtained by the voltage-phase arithmetic unit 18 from the magnetic flux phase $\theta_0$, thereby obtaining the phase difference $\Delta\theta$. In the case of the synchronous exchange, the switch 16 switches the input to the speed controller 15 from the difference in speed $\Delta\omega$ to the difference in voltage phase $\Delta\theta$. Then the above-described PLL is formed so that the phase $\theta_v$ of the output voltage from the inverter 5 coincides with the phase $\theta_p$ of the power-supply voltage. Under these conditions, the inverter-side switch 6 is closed to energize the inverter 5 while the commercial-power-supply-side switch 2 is opened and the switch 16 is switched from the voltage phase difference $\Delta\theta$ side to the speed difference $\Delta\omega$ side so that the commercial synchronous exchange is accomplished. Thereafter it becomes possible to control the speed by the inverter 5.

Figure 3:
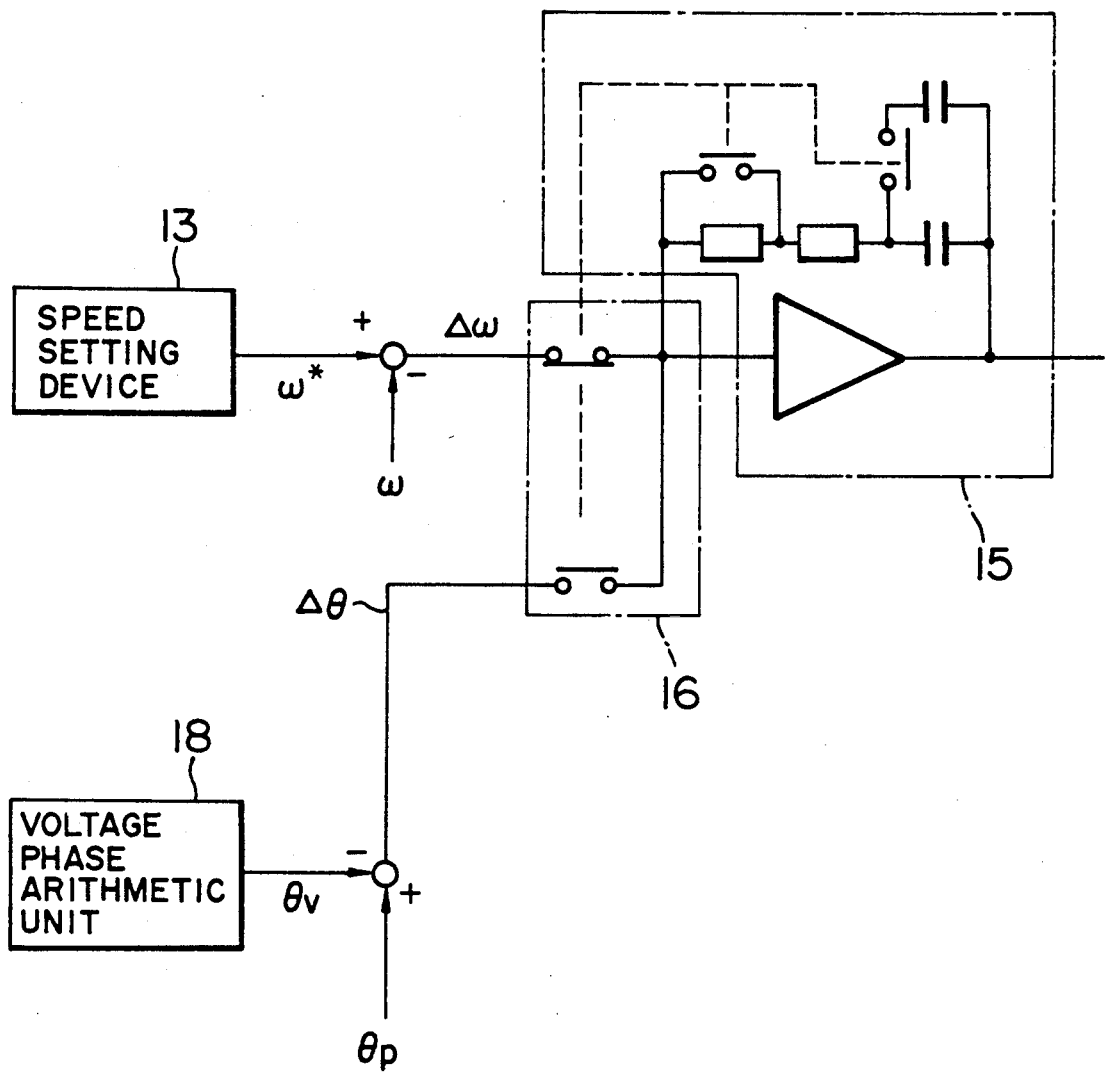
FIG. 3 is a block diagram illustrating a portion of a modification of the second embodiment shown in FIG. 2.

In the case of the establishment of the PLL, the speed controller 15 performs the function of a filter for the angular difference $\Delta\theta$, but the transfer function is different from that of the speed control system so that when the proportional-integration gain is same, unsatisfactory control operation occurs. In order to solve this problem, as shown in FIG. 3, not only the switch 16 switches to the speed difference $\Delta\omega$ from the voltage phase difference $\Delta\theta$ but also, as indicated by the broken lines, the proportional gain and/or the integrated gain of the speed controller 15 is varied, whereby an optimum value can be obtained.

Figure 4:
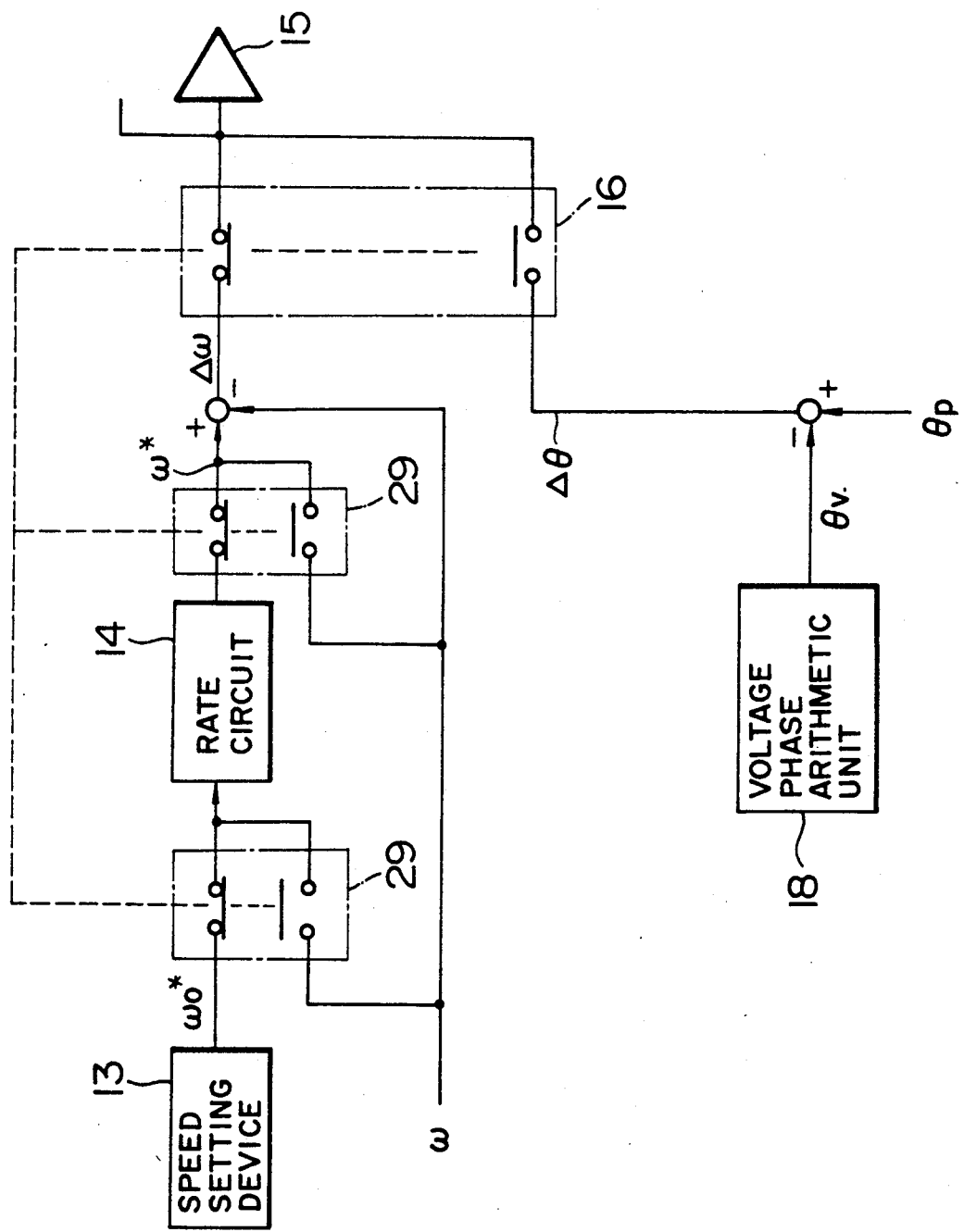
FIG. 4 is a block diagram illustrating a portion of another modification of the second embodiment shown in FIG. 2.

When the switch 16 is switched to the speed difference $\Delta\omega$ side after the completion of the commercial synchronous exchange and if there is a difference between the speed reference $\omega^*$ and the speed $\omega$, the induction motor 1 is quickly accelerated or decelerated until its rotational speed reaches the speed reference $\omega^*$. However, such operation is not preferable for not only the induction motor but also for a machine which is a load of the induction motor. In order to overcome such a problem, as shown in FIG. 4, the rate circuit 14 which limits an acceleration or deceleration rate is connected to the output side of the speed setting device 13 and during the commercial synchronous exchange, a switch 29 is switched to the detected speed $\omega$ side. Then, during the exchange, the speed difference $\Delta\omega$ becomes zero. Upon completion of the exchange, the switch 16 is switched to the speed difference $\Delta\omega$ side and simultaneously the switches 29 are switched to the speed reference $\omega^*$ side so that the rotational speed of the induction motor can slowly reach a predetermined rotational speed at an acceleration or deceleration rate determined by the rate circuit 14.

Third Embodiment

Figure 5:
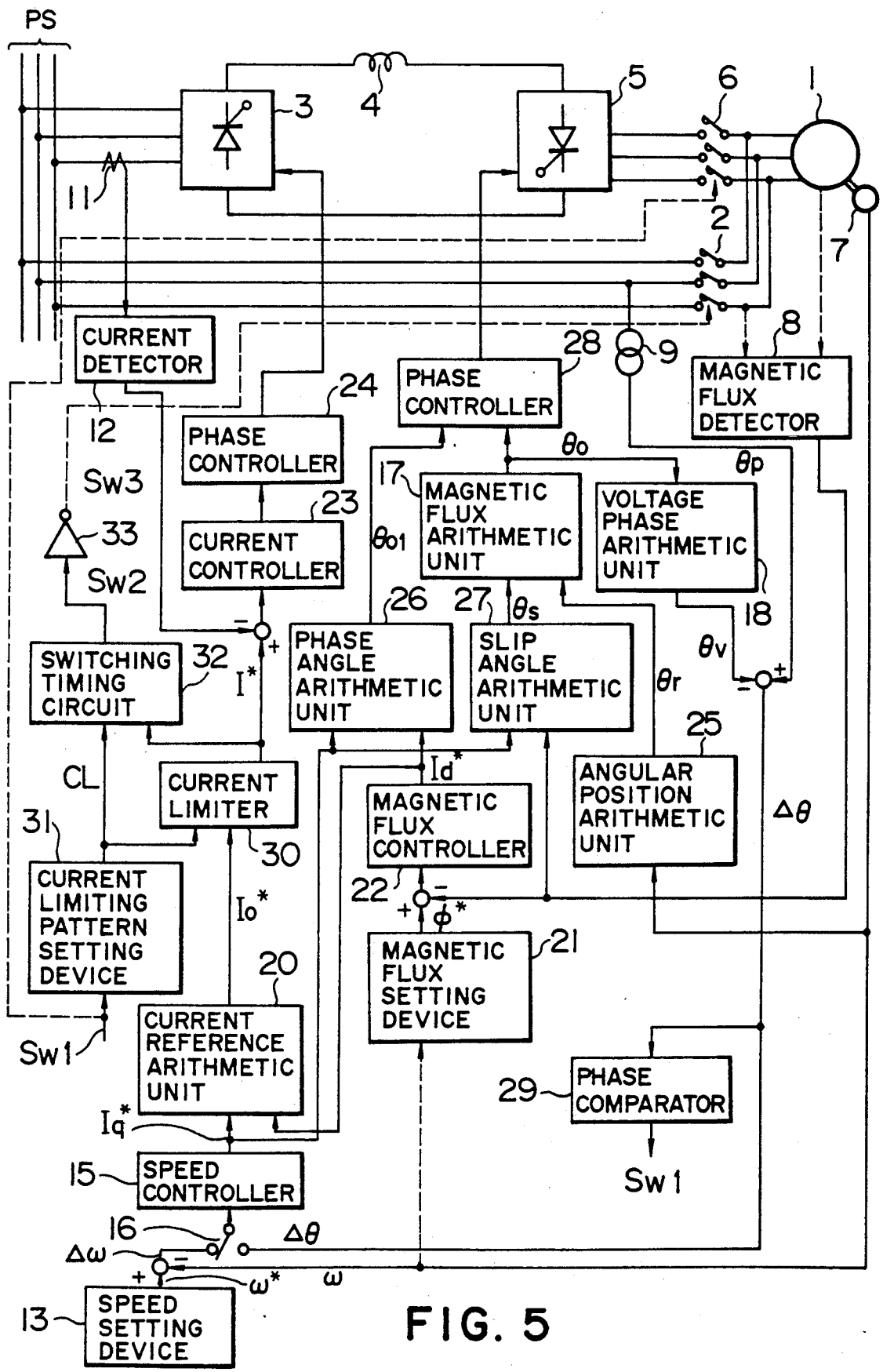
FIG. 5 is a block diagram of a third embodiment of an induction motor control system in accordance with the present invention.

FIG. 5 shows a third embodiment of the present invention best adapted to effect the commercial synchronous exchange. The third embodiment is substantially similar to the second embodiment shown in FIG. 2 except that circuit elements 29-33 are further added. Connected to the output side of the current-reference arithmetic unit 20 is a current limiter 30 which limits the current reference $I_0^*$ computed by the current-reference arithmetic unit 20 to less than a maximum allowable value $I_m^*$ and which also limits the current-reference variation rate which is determined by a current limiting pattern setting device 31. When a phase comparator 29 detects $\Delta\theta=0$, its output signal Sw1 rises to a HIGH level, thereby activating the current limiting pattern setting device 31 and also closing the switch 6. In response to the outputs from the current limiting pattern setting device 31 and the current limiter 30, the switching signal Sw2 is derived from a switch actuating timing circuit 32 and is inverted into the switching signal Sw3 by an inverter 33. In response to the inverted switching signal Sw3, the switch 2 is opened or closed.

Figure 6:
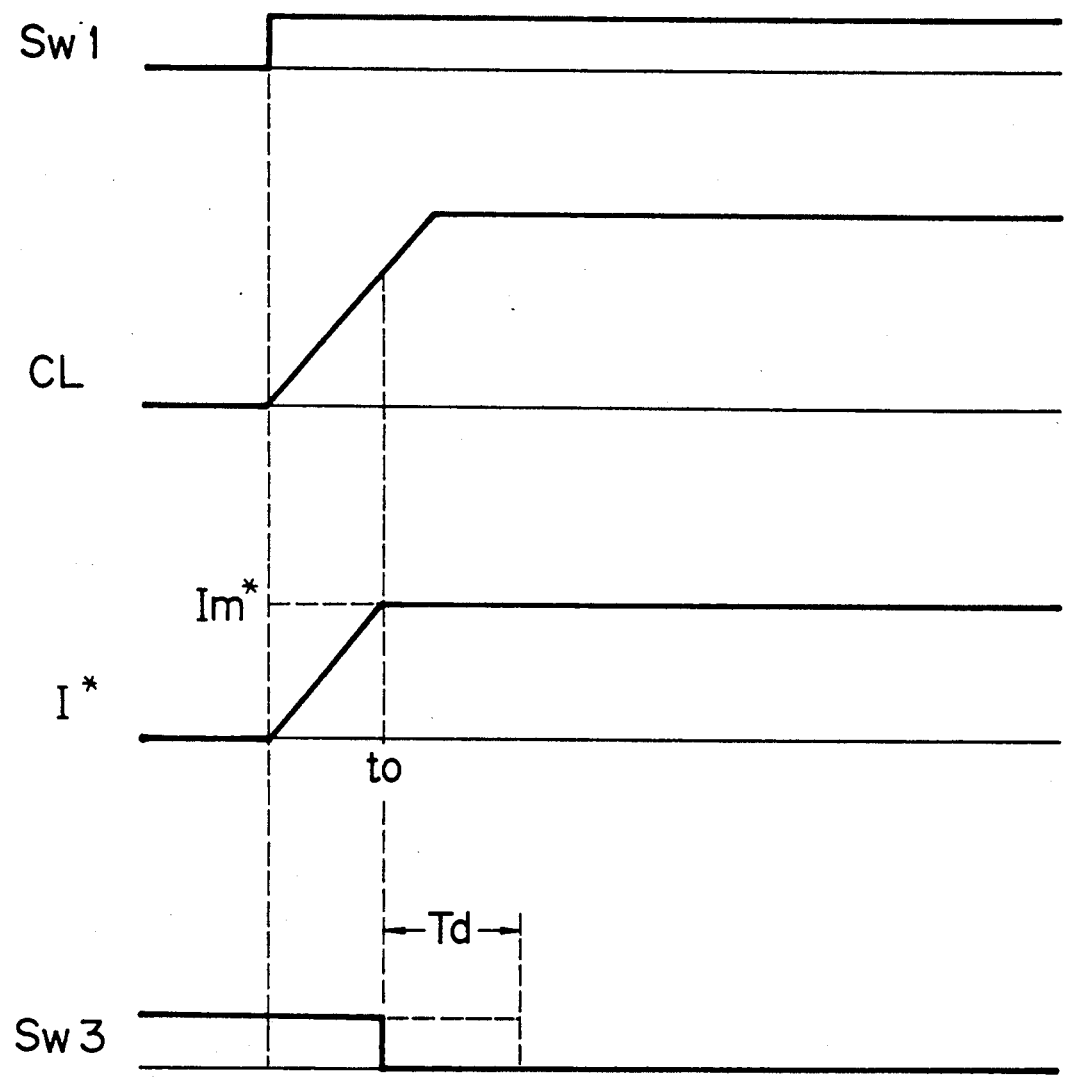
FIG. 6 is a time chart used to explain the power supply switching of the third embodiment shown in FIG. 5.

In the third embodiment, when the phase comparator 29 detects that the phase $\theta$ of the output voltage from the inverter 5 coincides with the phase $\theta_p$ of the commercial power supply voltage; that is, when $\Delta\theta=0$ is detected, the signal Sw1 for closing the inverter-side switch 6 is derived. In this case, as shown in FIG. 6, the output CL from the current limiting pattern setting device 31 rises at a predetermined rate. However, even in this case, the speed controller 16 is still operating so that the current reference I* output from the current limiter 30 increases under the current limiting condition (the maximum value $I_m$*). The switching timing circuit 32 compares the current reference I* derived from the current limiter 30 with the output CL from the current limiting pattern setting device 31 and at a time $t_0$ when a difference between I* and CL occurs, the switching signal Sw2 rises to the HIGH level. The inverter 33 inverts the signal Sw2 into the signal Sw3 which is at the LOW level. In response to the inverted signal Sw3, the commercial-power-supply-side switch 2 is opened. When the exchange operation is carried out in the manner described above, at a time $t_0$ when the switch 2 is opened, the output current from the inverter 5 becomes equal to the current flowing through the induction motor 1 so that an undesired amount of current is not supplied to the induction motor 1. Therefore, the induction motor 1 is prevented from being over-excited and stable exchange can be accomplished without producing an undesired amount of torque.

Figure 7:
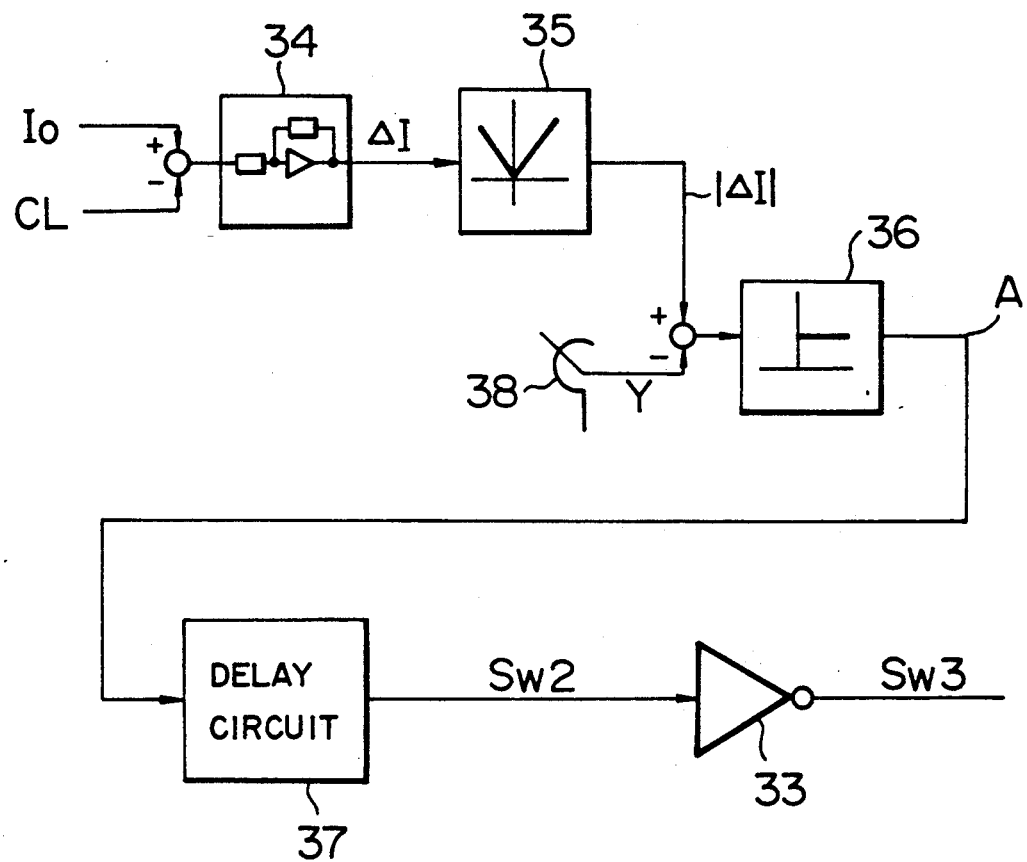
FIG. 7 is a block diagram illustrating a portion of a more practical construction of the third embodiment shown in FIG. 5.

FIG. 7 shows a block diagram of a circuit adapted to accomplish the exchange operation described above with reference to FIG. 6. The comparator 34 compares the current reference $I_0$* from the current-reference arithmetic unit 20 with the output signal CL from the current limiting pattern setting device 31 and delivers a difference ΔI therebetween. An absolute-value conversion circuit 35 outputs the absolute value |ΔI| of the difference ΔI. A second comparator 36 compares the set point value Y of a setting device 38 with the absolute value |ΔI| and delivers the signal A at the HIGH level when |ΔI| is greater than the set value Y (|ΔI| > Y). In this case, when a delay circuit 37 is disregarded, the signal A becomes equal to the signal Sw2. The inverter 33 outputs the signal Sw3 in response to which the commercial-power-supply-side switch 2 is opened.

In FIG. 7, a delay circuit 37 is provided so that the signal Sw2 is output with a time delay $T_d$ with respect to the time $t_0$ (See FIG. 6) when the signal A is output from the comparator 36 after the comparator 36 has compared the absolute value |ΔI| derived from the absolute value conversion circuit 35 with the set value Y. The signal Sw2 is inverted into the signal Sw3 by the inverter 33. As described above, the signal Sw2 with a predetermined time delay is generated so that a more positive exchange operation can be ensured.

Fourth Embodiment

Figure 8:
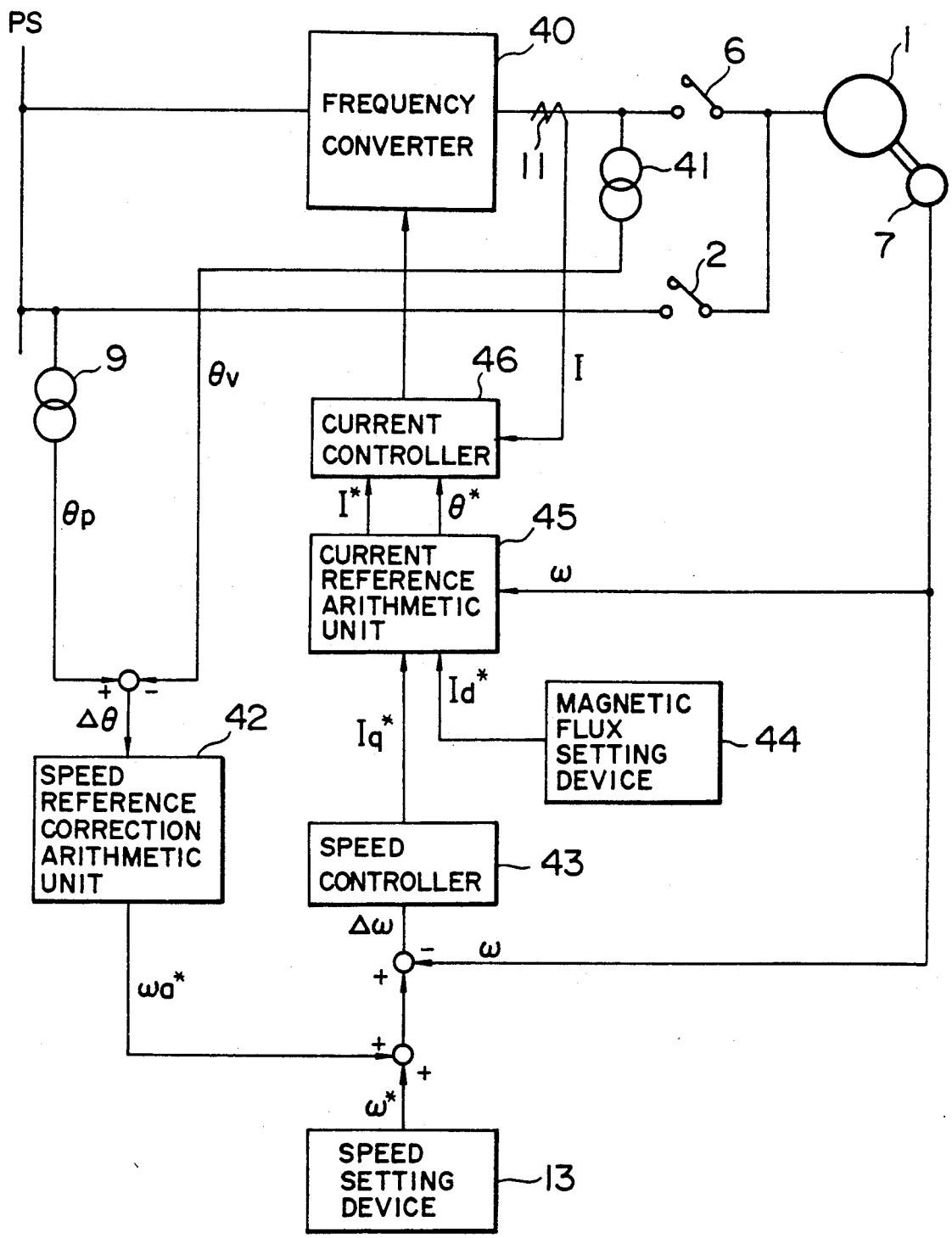
FIG. 8 is a block diagram of a fourth embodiment of an induction motor control system in accordance with the present invention.

FIG. 8 shows a fourth embodiment of the present invention best adapted to execute not only the commercial synchronous switching but also the commercial synchronous exchange. In the fourth embodiment, instead of the commutator and the inverter, a frequency converter 40 is used. The speed-reference-correction arithmetic unit 42 computes a speed reference correction value $\omega_a$* which causes a zero value for the phase difference Δθ between the phase $\theta_p$ of the voltage of the commercial power supply PS which is detected by the instrument transformer 9 on the one hand, and the phase $\theta_v$ of the output voltage from the frequency converter 40 which is detected by an instrument transformer 41. The sum of the speed reference correction value $\omega_a$* and the speed reference $\omega$* derived from the speed setting device 13 is regarded as a corrected speed reference and is compared with the speed ω. The difference Δω (=ω*+$\omega_a$*−ω) is applied to a speed controller 43 which in turn computes a torque current reference $I_q$* which makes the difference Δω zero. A magnetic flux setting device 44 generates an excitation current reference $I_d$* corresponding to a desired magnetic flux reference Φ*. A current-reference arithmetic unit 45 determines the amplitude reference I* and the phase reference θ* of the primary current of the motor in response to the torque current reference $I_q$*, the excitation current reference $I_d$* and the speed ω. A current controller 46 performs the phase control of the frequency converter 40 in such a way that the feedback current I detected by the current transformer 11 becomes equal to the current reference (I*, θ*) derived from the current-reference arithmetic unit 45.

In the fourth embodiment shown in FIG. 8, the speed controller 43, the current-reference arithmetic unit 45, the current controller 46, the frequency converter 40 and the speed-reference-correction arithmetic unit 42 constitute a phase-locked loop (PLL) so that the speed-reference-correction value $\omega_a$* which decreases the phase difference Δθ is generated.

In the case of carrying out the commercial synchronous switching with the induction control system with the above-described construction, first the frequency converter 40 controls the speed ω of the induction motor 1 and then the speed-reference-correction arithmetic unit 42 computes a speed reference correction value $\omega_a$* which causes a zero value for the difference in phase Δθ between the phase $\theta_p$ of the commercial power supply voltage and the phase $\theta_v$ of the converter output voltage and which is added to the speed reference ω*. The speed reference correction value $\omega_a$* serves to control the slip frequency so that the primary frequency becomes equal to the frequency of the commercial power supply. When the phase difference Δθ decreases sufficiently, the commercial-power-supply-side switch 2 is closed and then the converter-side switch 6 is opened, whereby the commercial synchronous switching is completed.

In the case of a voltage source type frequency converter of the type capable of delivering the output voltage from the frequency converter 40 while the converter-side switch 6 is kept opened, in the case of the commercial synchronous exchange, the commerical power supply PS is switched to the frequency converter 40 in a manner substantially similar to that described above. That is, the frequency converter 40 is driven with the converter-side switch 6 being closed; the phase $\theta_v$ of the converter output voltage is detected to generate the speed reference correction value $\omega_a$*, is generated so that the phase difference Δθ between the phase $\theta_v$ and the phase $\theta_p$ of the commercial power supply voltage becomes minimum; and when the phase difference Δθ becomes sufficiently small, the converter-side switch 6 is closed. Thereafter, the commercial-power-supply side switch 2 is opened, whereby the commercial synchronous exchange is completed.

In the case of a current source type converter which cannot function with the output side of the frequency converter 40 being kept open, the commercial synchronous exchange cannot be carried out by the above-described system. Therefore a modification of the fourth embodiment in which a current source type frequency converter 50 is utilized will be described with reference to FIG. 9.

Figure 9:
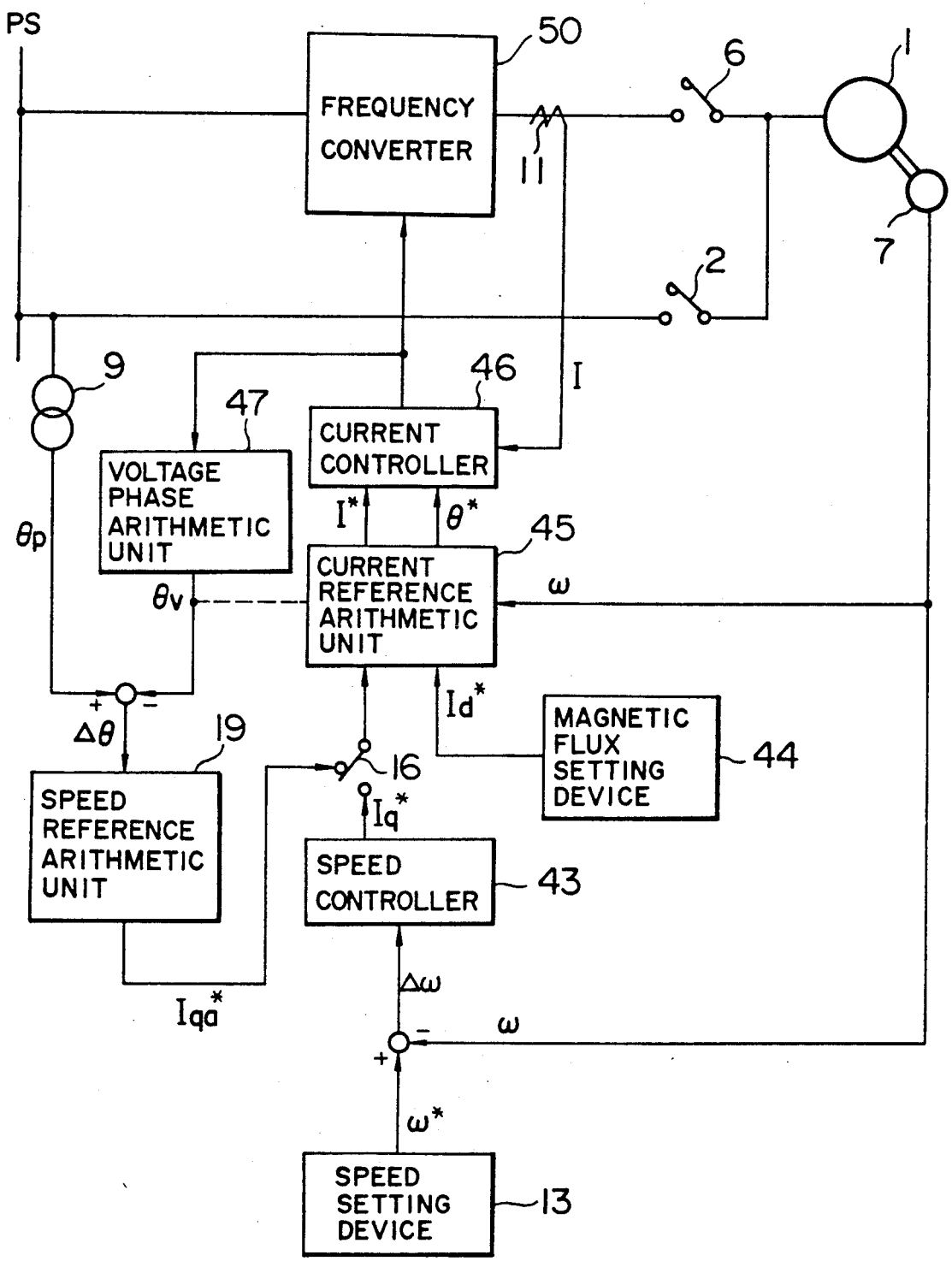
FIG. 9 is a block diagram of a modification of the fourth embodiment shown in FIG. 8.

In both FIGS. 8 and 9, the same reference numerals are used to designate similar parts so that the circuit components already described above with reference to FIG. 8 shall not be described. Reference numeral 47 designates a voltage-phase arithmetic unit which estimates an output voltage phase $\theta_v$ in response to the output signal derived from the current controller 46. In this modification, the speed-reference arithmetic unit 19 responds to the phase difference $\Delta\theta$ to compute a torque current reference $I_{qa}^*$ which makes the phase difference $\Delta\theta$ zero. The torque current reference $I_{qa}^*$ or the torque current reference $I_q^*$ from the speed controller 43 is applied through the switch 16 to the current-reference arithmetic unit 45.

Next, the mode of the synchronous exchange with the control system with the above-described construction will be described.

Under the condition that the induction motor 1 is driven by the commercial power supply PS with the commercial-power-supply-side switch 2 being closed, only the control circuit for the frequency converter 50 is enabled so that in response to the control signal applied from the current controller 47 to the frequency converter 50, the phase $\theta_v$ of the output voltage is estimated. The output voltage phase $\theta_v$ and the commercial-power-supply-voltage phase $\theta_p$ are compared with each other to obtain the phase difference $\Delta\theta$ in response to which the speed-reference arithmetic unit 19, computes a torque current reference $I_{qa}^*$ which is applied through the switch 16 to the current-reference arithmetic unit 45. In response to the torque current reference $I_{qa}^*$, the excitation current reference $I_d^*$ and the speed the current-reference arithmetic unit 45 outputs the amplitude reference I* and the phase reference $\theta^*$ of the primary current. The current controller 46 delivers to the frequency converter 50 the control signal in response to which the amplitude reference I* and the phase reference $\theta^*$ of the primary current can be attained. In FIG. 9, the voltage-phase arithmetic unit 47, the speed-reference arithmetic unit 19, the current-reference arithmetic unit 45 and the current controller 46 constitute a phase-locked loop or PLL which in turn delivers the torque current reference $I_{qa}^*$ which decreases the phase difference $\Delta\theta$ to a minimum. When the phase difference $\Delta\theta$ is sufficiently decreased while only the operation of the control circuit for the frequency converter 50 is continued, the converter-side switch 16 is closed so that the frequency converter 50 delivers the output voltage whose phase $\theta_v$ coincides with the phase $\theta_v$ of the commercial power supply voltage and thereafter the commercial-power-supply-side switch 2 opened. Simultaneously the switch 16 is switched to the speed controller side 43 and thereafter the frequency converter 50 controls the rotational speed of the induction motor 1. Thus, the commercial synchronous exchange is completed.

What is claimed is:

1. An induction motor control system comprising:
a variable-frequency power supply for supplying an output voltage at a given phase for driving an induction motor, having a rotational speed, a magnetic flux phase and a voltage, at various speeds;
first switching means, connected to said induction motor, said variable-frequency power supply and a commercial power supply for supplying a voltage at a given phase for selectively connecting said induction motor to said commercial power supply or said variable-frequency power supply;
means for calculating a first torque current reference from a speed difference between a speed reference and said rotational speed of said induction motor;
means for calculating a second torque current reference corresponding to a phase difference between said phase of said output voltage of said variable-frequency power supply or a magnetic flux reference, having a given phase, for said induction motor, and said phase of said voltage of said commercial power supply;
second switching means for selectively outputting said first torque current reference or said second torque current reference as a torque current reference, prior to switching of said first switching means; and
vector control means for performing vector control of said variable-frequency power supply in response to said torque current reference outputted from said second switching means, and an excitation current reference calculated from said speed reference and a detected magnetic flux of said induction motor, so that said rotational speed and said voltage of said induction motor are maintained at predetermined values, respectively;
whereby said torque current reference outputted from said second switching means controls a slip frequency of said induction motor through said vector control means.

2. An induction motor control system as set forth in claim 1, wherein said vector control means controls said phase of said output voltage of said variable-frequency power supply with said voltage of said commercial power supply by using said torque current reference to synchronize said output voltage of said variable-frequency power supply with said voltage of said commercial power supply.

3. An induction motor control system as set forth in claim 1, further comprising:
voltage detection means for detecting said output voltage of said commercial power supply; and
means for correcting said excitation current reference in response to a voltage difference between a voltage reference and said output voltage detected by said voltage detection means.

* * * * *